(12) United States Patent
Monastiere

(10) Patent No.: US 6,958,869 B2
(45) Date of Patent: Oct. 25, 2005

(54) SWIVEL-BASE SUNLIGHT REFLECTOR AND KIT FOR ASSEMBLING SAME

(76) Inventor: David Monastiere, 27675 Barrington, Madison Heights, MI (US) 48071

( * ) Notice: Subject to any disclaimer, the term of this patent is extended or adjusted under 35 U.S.C. 154(b) by 16 days.

(21) Appl. No.: 10/783,420

(22) Filed: Feb. 20, 2004

(65) Prior Publication Data
US 2005/0185303 A1 Aug. 25, 2005

(51) Int. Cl.7 .............................. G02B 7/02; F21S 4/00
(52) U.S. Cl. ........................ 359/819; 362/811; 359/896
(58) Field of Search ................................ 359/813, 819, 359/822, 873, 565, 896; 362/1, 811

(56) References Cited

U.S. PATENT DOCUMENTS

| | | | | |
|---|---|---|---|---|
| 3,885,797 A | * | 5/1975 | Booty et al. ................... 369/69 |
| 3,907,431 A | * | 9/1975 | McDougal ................... 356/364 |
| 4,148,299 A | | 4/1979 | Sherman, Jr. |
| 4,505,537 A | * | 3/1985 | Funato ......................... 359/18 |
| 4,556,278 A | * | 12/1985 | Schell ........................ 359/18 |
| 4,832,453 A | | 5/1989 | Saad-Cook |
| 5,291,337 A | * | 3/1994 | Greger et al. ................ 359/846 |
| 5,715,059 A | * | 2/1998 | Guerra ....................... 356/600 |
| 5,791,775 A | | 8/1998 | Douglass, II |
| 5,796,487 A | * | 8/1998 | Guerra ....................... 356/613 |
| 5,997,151 A | | 12/1999 | Douglass, II |
| 6,154,326 A | * | 11/2000 | Ueyanagi et al. ........... 359/819 |
| 6,231,196 B1 | | 5/2001 | Mahachek |
| 6,312,142 B1 | * | 11/2001 | Dorsa .......................... 362/257 |
| 6,330,059 B1 | * | 12/2001 | Ishiguro et al. ........... 356/237.5 |
| 6,416,195 B1 | * | 7/2002 | Lin .............................. 362/35 |
| 6,540,381 B1 | | 4/2003 | Douglass, II |
| 6,584,713 B2 | * | 7/2003 | Huang ......................... 40/431 |
| 6,880,961 B2 | * | 4/2005 | Lin .............................. 362/554 |

* cited by examiner

Primary Examiner—Ricky L. Mack
(74) Attorney, Agent, or Firm—Young & Basile, P.C.

(57) ABSTRACT

A sunlight defracting device for creating aesthetically pleasing light displays on walls near windows includes a blank compact disc having a light refractive surface, a ball having a non-diametric flat surface attached to the disc by means of an adhesive strip and a base on which the ball may be rested. The components may be sold in the assembled form or as a kit in unassembled form.

6 Claims, 2 Drawing Sheets

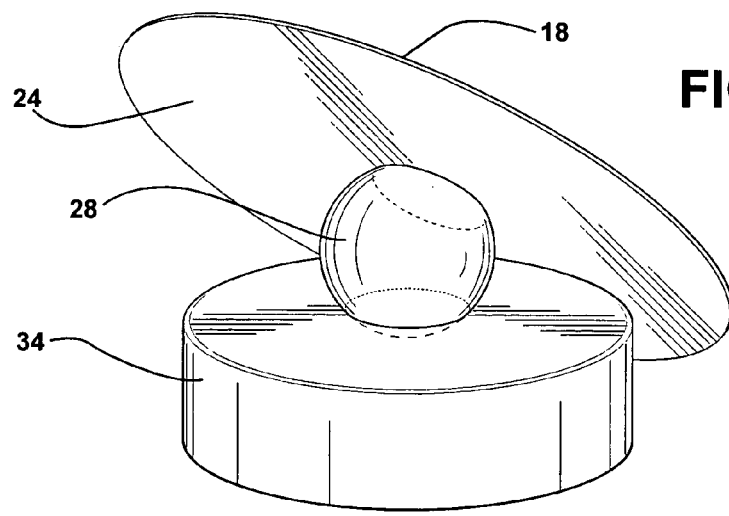
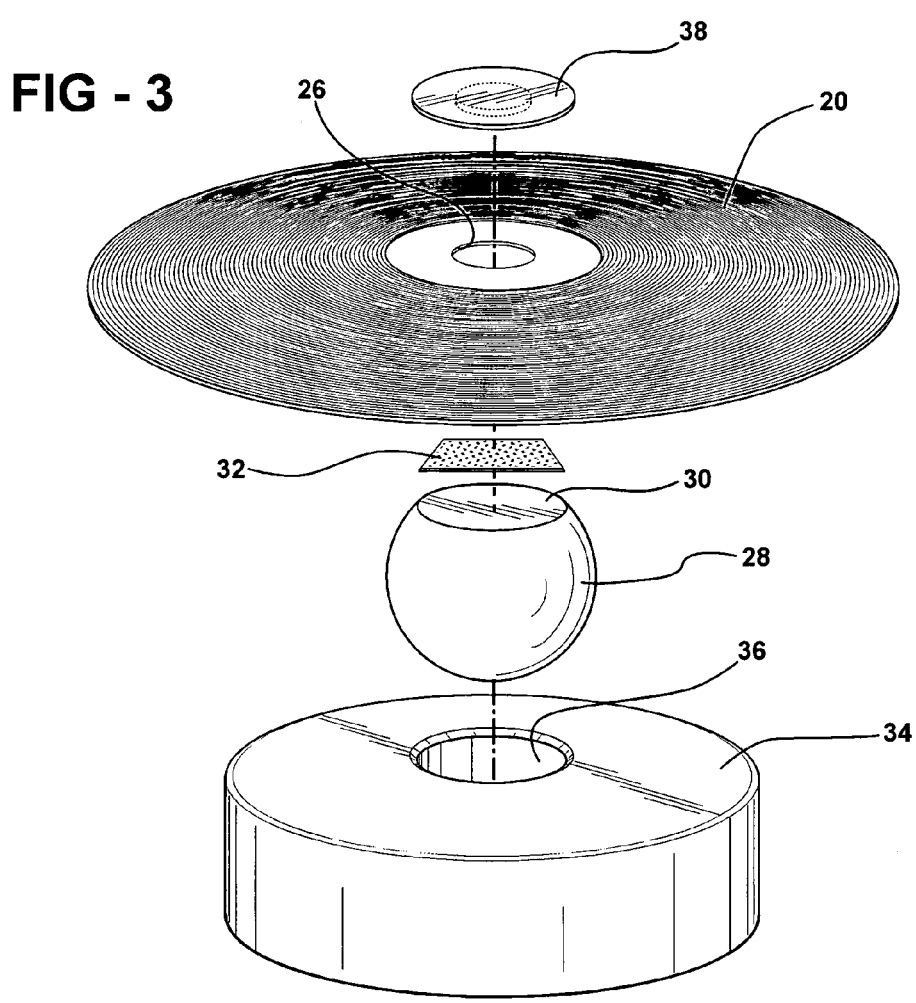

SWIVEL-BASE SUNLIGHT REFLECTOR AND KIT FOR ASSEMBLING SAME

FIELD OF THE INVENTION

This invention relates to novelty items suitable for retail sale and particularly to a sunlight refractive reflector having a simple but effective stand which permits the attitude of a refractive disc to be adjusted relative to incident sunlight rays.

BACKGROUND OF THE INVENTION

It is known to reflect sunlight onto a wall or other suitable projection surface to create aesthetically pleasing displays. A device for accomplishing this is disclosed in U.S. Pat. No. 4,832,453 issued May 23, 1989 to Janet Saad-Cook. The device is complicated in structure and would be expensive to manufacture as disclosed.

SUMMARY OF THE INVENTION

The present invention provides a simple and inexpensive sunlight reflecting device capable of producing pleasing displays or patterns on walls or other suitable surfaces. The invention, at least in its preferred form, takes advantage of the light refracting characteristics of the recording surface of a common compact disc by providing the disc along with other components to create an easily manually manipulable swivel base for a compact disc which allows it to be placed on any convenient surface near a window which is flooded with sunlight.

In the preferred form, the invention comprises a blank compact disc with a standard center hole, a metal ball having a non-diametric flat surface machined thereon, a strip of two-sided tape for attaching the flat surface of the ball to the non-refracting/non-recording side of the compact disc and over the center hole and an annular base which is stable when placed on a flat surface and which has a cavity formed, for example, by a through-hole to receive the ball in a stable relationship therein. This combination is easily assembled after which the attitude of the disc can be changed without the use of tools or special knowledge to cause the reflected and refracted sunlight to fall upon a nearby wall and in an aesthetically interesting and pleasing fashion.

The term "non-diametric surface" is used herein to refer to a surface the largest dimension of which is less than a full diameter of the ball on which the surface is found.

In the preferred form, the kit further comprises a cap which fits over the center hole of the compact disc on the exposed reflective side so as to improve the appearance thereof. The outer surface of the disc also provides a place for location of a trademark or other decorative indicia.

Other applications of the present invention will become apparent to those skilled in the art when the following description of the best mode contemplated for practicing the invention is read in conjunction with the accompanying drawing.

BRIEF DESCRIPTION OF THE DRAWING

The description herein makes reference to the accompanying drawing wherein like reference numerals refer to like parts throughout the several views, and wherein:

FIG. 2 is a perspective view of an assembled device for use in the environment of FIG. 1; and FIG. 3 is an exploded view of the device of FIG. 2 showing various unassembled components thereof.

DETAILED DESCRIPTION OF THE ILLUSTRATIVE EMBODIMENT

Figure 1:
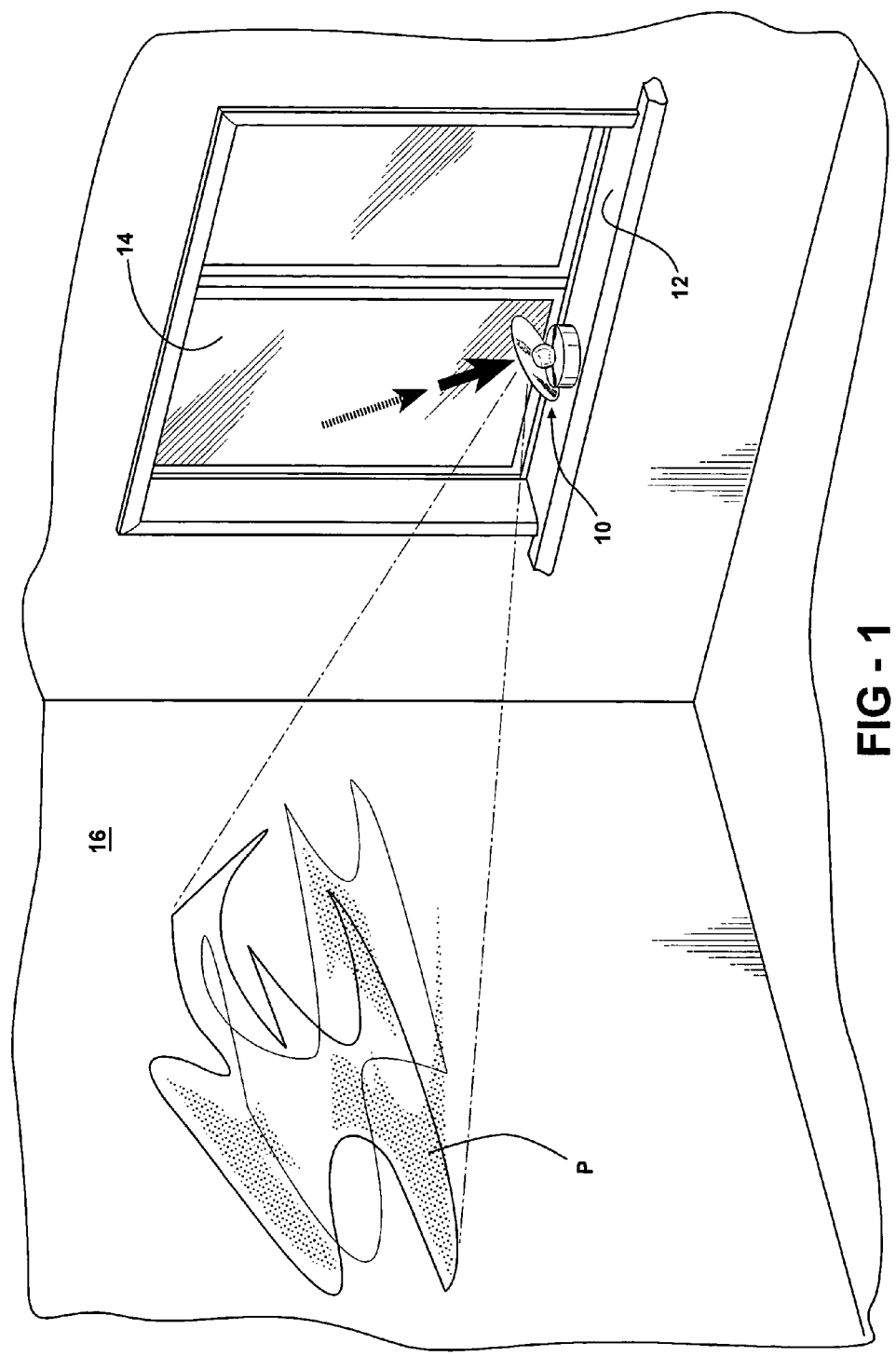
FIG. 1 is a perspective view of a device constructed in accordance with the invention placed on a flat surface near a window flooded with sunlight to cause an aesthetically pleasing pattern to be cast on a nearby wall.

FIG. 1 shows the device 10 of the present invention resting on a flat window sill surface 12 adjacent a window 14 which is flooded with sunlight as shown by the double arrows. The device 10 is effective to cast an aesthetically pleasing and interesting refracted light pattern P on an adjacent wall 16.

Looking to FIGS. 2 and 3, the device 10 is shown to comprise a blank compact disc 18 of approximately four inches in diameter and having a light refractive recording surface 20 and an opposite undersurface 24. A center hole 26 is formed in the compact disc 18 for the purpose of mounting it in a player as a memory device, the center hole 26 playing no particular part in the functionality of the disc 18 in the combination of the present invention.

A swivel stand is provided by means of a metal ball 28 having a non-diametric flat surface 30 machined thereon. A small strip 32 of two-sided adhesive tape is provided for adhesively securing the underside 24 of the compact disc 18 to the flat surface 30 of the ball 28. The base further comprises a metal annulus 34 having a beveled through-hole 36 formed therein, the diameter of which is sufficient to cradle the ball 28 therein in a stable fashion and permit the attitude of the compact disc 18 to be manually changed by simple manipulation and without the use of tools. A small plastic cap 38 may be provided to cover the center hole 26 on the refractive surface 20. A trademark or other indicia may be added to the top surface of the cap 38. Alternatively, the disc may be specially made without a hole.

The combination shown in FIGS. 2 and 3 may be sold or provided to an end user in assembled form or as an unassembled kit at a reasonable price along with a set of instructions (not shown) for simple assembly without the use of tools. Such assembly would, of course, include removing protective strips (not shown) from the opposite sides of the tape strip 32, using the prepared two-sided tape strip 32 to cement the flat surface 30 of the ball 28 to the underside 24 of the compact disc 18, and thereafter placing the ball and the disc in the assembled fashion on the annulus 34 in the manner shown in FIG. 1. As the sun angle changes, the attitude of the disc 18 can be changed along with it to make sure that the pattern P is cast in the desired fashion on a nearby wall.

Although the disc 18 is described herein as a blank or even used compact disc which is typically used for data recording, it is to be understood that any inexpensive lightweight flat plate-like object having a sunlight refractive surface on at least one side can be used. The plate-like object need not be round but can assume any other shapes including square, rectangular, oval and so forth.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law. It is also to be understood that the light pattern P changes with sun angle and the angle of incidence on the disc surface; i.e., it may be rainbow-shaped or circular or V-shaped as desired.

What is claimed is:

1. A sunlight scattering device for creating a pleasing light pattern on a nearby wall comprising:
    a flat, rigid disc having a sunlight refractive surface and an opposite surface;
    a ball having a flat surface attached to the opposite surface of the refractive disc; and
    a base having a cavity to receive and cradle the ball therein in stable relationship whereby the attitude of the disc can be manually changed while allowing the disc and ball to rest on the base in a stable fashion.

2. The device defined in claim 1 wherein the disc is a blank optically recordable compact disc with a center hole.

3. The device defined in claim 1 further including an adhesive strip for attaching the flat surface of the ball to the compact disc so that it overlies the center hole and the flat surface is non-diametric.

4. The device defined in claim 1 wherein the base is annular and the cavity is a hole extending substantially entirely through the annular base.

5. A kit for assembling a sunlight refractive device comprising:
    a blank compact disc having a sunlight refractive surface and an opposite surface and a center hole;
    a ball having a flat surface;
    an adhesive strip for attaching the surface of the ball to the opposite surface of the compact disc over the center hole; and
    a base with a cavity sized to receive the ball;
    the kit comprising unassembled components as defined above.

6. The kit defined in claim 5 wherein the flat surface is non-diametric.

* * * * *